US012046417B2

(12) United States Patent
Clarke et al.

(10) Patent No.: US 12,046,417 B2
(45) Date of Patent: Jul. 23, 2024

(54) MULTIPOLE MAGNET

(71) Applicant: UNITED KINGDOM RESEARCH AND INNOVATION, Swindon (GB)

(72) Inventors: James Anthony Clarke, Warrington (GB); Benjamin John Arthur Shepherd, Warrington (GB); Norbert Collomb, Warrington (GB); Alexander Robert Bainbridge, Warrington (GB)

(73) Assignee: UNITED KINGDOM RESEARCH AND INNOVATION (GB)

( * ) Notice: Subject to any disclaimer, the term of this patent is extended or adjusted under 35 U.S.C. 154(b) by 416 days.

(21) Appl. No.: 17/439,705

(22) PCT Filed: Mar. 18, 2020

(86) PCT No.: PCT/GB2020/050714
§ 371 (c)(1),
(2) Date: Sep. 15, 2021

(87) PCT Pub. No.: WO2020/188276
PCT Pub. Date: Sep. 24, 2020

(65) Prior Publication Data

US 2022/0208427 A1 Jun. 30, 2022

(30) Foreign Application Priority Data

Mar. 19, 2019 (GB) ..................................... 1903741

(51) Int. Cl.
*H01F 7/02* (2006.01)
*H01F 7/04* (2006.01)
*H01F 41/02* (2006.01)
*H05H 7/04* (2006.01)

(52) U.S. Cl.
CPC ....... *H01F 7/0278* (2013.01); *H01F 41/0253* (2013.01); *H05H 7/04* (2013.01)

(58) Field of Classification Search
CPC ...... H01F 7/0278; H01F 41/0253; H05H 7/04
USPC ............................................ 250/396 R, 397
See application file for complete search history.

(56) References Cited

U.S. PATENT DOCUMENTS

| | | | |
|---|---|---|---|
| 4,355,236 A | 10/1982 | Holsinger | |
| 4,429,229 A | 1/1984 | Gluckstern | |
| 6,486,748 B1 | 11/2002 | Libby et al. | |
| 7,271,689 B1 | 9/2007 | Danby et al. | |
| 2002/0158736 A1* | 10/2002 | Gottschalk | H05H 7/04 335/306 |

(Continued)

FOREIGN PATENT DOCUMENTS

| | | | |
|---|---|---|---|
| EP | 2506400 A1 | 10/2012 |
| GB | 2 270 414 A | 3/1994 |

(Continued)

*Primary Examiner* — Nicole M Ippolito
(74) *Attorney, Agent, or Firm* — Cowan, Liebowitz & Latman, P.C.; Mark Montague

(57) ABSTRACT

There is provided a multipole magnet for deflecting a beam of charged particles. The multipole magnet comprises a plurality of ferromagnetic poles and a plurality of permanent magnet assemblies to supply a magnetomotive force to the ferromagnetic poles. At least one of the permanent magnet assemblies has a plurality of discrete permanent magnet positions and a plurality of permanent magnets each fixed in one of the permanent magnet positions.

26 Claims, 4 Drawing Sheets

(56) References Cited

U.S. PATENT DOCUMENTS

| | | | |
|---|---|---|---|
| 2005/0258784 | A1 | 11/2005 | Makita et al. |
| 2007/0018764 | A1 | 1/2007 | Martinez Garcia et al. |
| 2009/0251238 | A1 | 10/2009 | Fullerton et al. |
| 2013/0207760 | A1 | 8/2013 | Clarke et al. |

FOREIGN PATENT DOCUMENTS

| | | | |
|---|---|---|---|
| JP | 10-270197 | A | 10/1998 |
| WO | 2009/141078 | A1 | 11/2009 |

* cited by examiner

MULTIPOLE MAGNET

TECHNICAL FIELD

The invention relates to a multipole magnet for deflecting a beam of charged particles, such as used in a particle accelerator. The invention also relates to a method of manufacturing a multipole magnet and a sub-assembly for a particle accelerator.

BACKGROUND

Multipole magnets comprise a plurality of magnetic poles and, among other things, are used to deflect, focus or otherwise alter the characteristics of beams of charged particles in particle accelerators. Multipole magnets may be used to change the overall direction of a beam, focus or defocus a beam, or correct aberrations in a beam. The suitability of a multipole magnet for performing these tasks is determined largely by the number of magnetic poles present. Quadrupole magnets having four magnetic poles are particularly suitable for focusing and defocusing a beam of charged particles. Magnets used in multipole magnets are typically electromagnets, comprising a current carrying wire coiled around a ferromagnetic pole. In modern particle accelerator drive beams, thousands of multipole magnets comprising electromagnets may be employed along a single drive beam.

The drive beam of the proposed Compact Linear Collider (CLIC) accelerator is expected to require approximately 42,000 quadrupole magnets. As such, the CLIC accelerator will likely suffer from near-prohibitive power consumption, with a total estimated usage of approximately 580 MW. This represents a problem with regards to power generation and delivery capabilities, as well as accelerator power and cooling infrastructure, environmental impact and significant running costs tied to energy prices. A significant portion of the predicted energy consumption, approximately 124 MW, is expected to arise from dissipation in normal conducting electromagnets, which will be compounded by efficiency of the delivery system and energy consumption of water cooling and pumping systems. To counter to this, it has been proposed to replace at least some of the electromagnets with permanent magnets that are capable of adjusting their magnetic field by moving permanent magnet material relative to an associated pole. Such permanent magnets are described in earlier patent application PCT/GB2011/051879, the content of which is incorporated herein by reference.

It is anticipated that the use of permanent magnets will have several advantages relevant to the CLIC accelerator, including no power draw during normal use, a small power draw when adjusting the field, reduced infrastructure, as there will be no requirement for large power supplies or cooling, and no vibration from water cooling systems or a need to extract excess heat. However, due to the expensive and fluctuating nature of permanent magnet material costs and the difficulty in sintering and magnetising permanent magnets, it is anticipated that the up-front costs of each permanent magnet may be higher than those for an equivalent electromagnet. Moreover, as the skilled readerwill appreciate, movement of the permanent magnet material is made against very large forces of magnetic attraction, i.e. the attraction of the permanent magnet material to the opposing pole. Moreover, the movement is required to be very accurate. Indeed, it is envisaged that the required accuracy of the position of the permanent magnet material may be less than 10 microns. Achieving the required accuracy makes known arrangements very expensive.

It is an object of embodiments of the invention to at least mitigate one or more problems associated with known arrangements.

SUMMARY OF THE INVENTION

According to an aspect of the invention, there is provided a multipole magnet for deflecting a beam of charged particles, the multipole magnet comprising: a plurality of ferromagnetic poles; and a plurality of permanent magnet assemblies to supply magnetomotive force to the ferromagnetic poles, at least one of the permanent magnet assemblies having a support providing a plurality of discrete, i.e. individually separate and distinct, permanent magnet positions and a plurality of permanent magnets each fixed in one of the plurality of discrete permanent magnet positions. Fixing each of the plurality of permanent magnets in different configurations, i.e. varying the number of permanent magnets fixed in the plurality of discrete permanent magnet positions, may allow for a modular approach to providing multipole magnets having different magnetic field strengths, thus reducing the cost and/or complexity of the manufacturing processes for producing multipole magnets.

In turn, the arrangement may also allow for reducing the required range of movement of the permanent magnet material, thus reducing the cost and/or complexity of positioning systems.

Moreover, the multipole magnet may be manufactured using smaller individual permanent magnets than magnets used in known arrangements. The smaller permanent magnets may be significantly easier and cheaper to mass produce, at both sintering and magnetisation stages of the manufacturing process, than magnets used in known arrangements. The smaller permanent magnets may also be easier to handle, due to reduced attractive forces, which may make assembly less complex, even accounting for an increased number of permanent magnets.

In certain embodiments, the plurality of discrete permanent magnet positions may be greater in number than the plurality of permanent magnets fixed therein. The plurality of permanent magnets may be arranged in the plurality of discrete permanent magnet positions symmetrically about a centre of the at least one of the permanent magnet assemblies. Additionally, or alternatively, the plurality of discrete permanent magnet positions may be a uniformly spaced array of discrete permanent magnet positions. The uniformly spaced array may be a grid of n by m discrete permanent magnet positions.

Each of the plurality of permanent magnets may be spaced apart from one another. Each of the plurality of permanent magnets may be substantially the same in shape and/or size as one another. One or more of the plurality of permanent magnets may be substantially cuboid.

Optionally, the at least one of the permanent magnet assemblies may comprise a framework of walls delimiting one or more of the plurality of discrete permanent magnet positions. One or more of the walls may be formed of a non-magnetic material. The at least one of the permanent magnet assemblies may comprise a base from which the framework of walls may be upstanding. The base may be formed of a paramagnetic material.

In certain embodiments, one or more of the plurality of permanent magnets may be bonded to the base. A gap may extend between one or more of the plurality of permanent magnets and one or more of the walls delimiting a respective one of the plurality of discrete permanent magnet positions. The gap may be filled at least partially by an adhesive material bonded to the base and the respective one or more of the plurality of permanent magnets.

The at least one of the permanent magnet assemblies may comprise a plurality of open-ended enclosures each delimiting one of the plurality of discrete permanent magnet positions. One or more of the plurality of open-ended enclosures may be provided by the framework of walls and the base.

In certain embodiments, each of the plurality of open-ended enclosures may be substantially the same in shape and/or size as one another. One or more of the plurality of open-ended enclosures may be a continuous five-sided compartment. One or more of the plurality of open-ended enclosures may be complementary in shape to one of the plurality of permanent magnets.

According to another aspect of the invention, there is provided a method of manufacturing a multipole magnet for deflecting a beam of charged particles, the method comprising: providing at least one permanent magnet assembly having a plurality of discrete permanent magnet positions; fixing a plurality of permanent magnets in the plurality of discrete permanent magnet positions; and arranging the at least one permanent magnet assembly to supply a magnetomotive force to a ferromagnetic pole of the multipole magnet.

According to yet another aspect of the invention, there is provided a sub-assembly for a particle accelerator, the sub-assembly comprising: a plurality of multipole magnets as described above disposed along a beamline to deflect, focus or otherwise alter one or more characteristics of a beam of charged particles passing along the beamline, wherein the at least one permanent magnet assembly of a first multipole magnet of the plurality of multipole magnets has a configuration different to that of a second multipole magnet of the plurality multipole magnets.

In certain embodiments, the configuration may be different in that the least one permanent magnet assembly of the first multipole magnet may have a different number of the plurality of permanent magnets to that of the second multipole magnet. Additionally, or alternatively, the configuration is different in that the least one permanent magnet assembly of the first multipole magnet may have one or more of the plurality of permanent magnets fixed in a different one or more of the plurality of permanent magnet positions to that of the second multipole magnet.

BRIEF DESCRIPTION OF THE DRAWINGS

Embodiments of the invention will now be described, by way of example only, with reference to the accompanying figures, in which.

DETAILED DESCRIPTION

Figure 1:
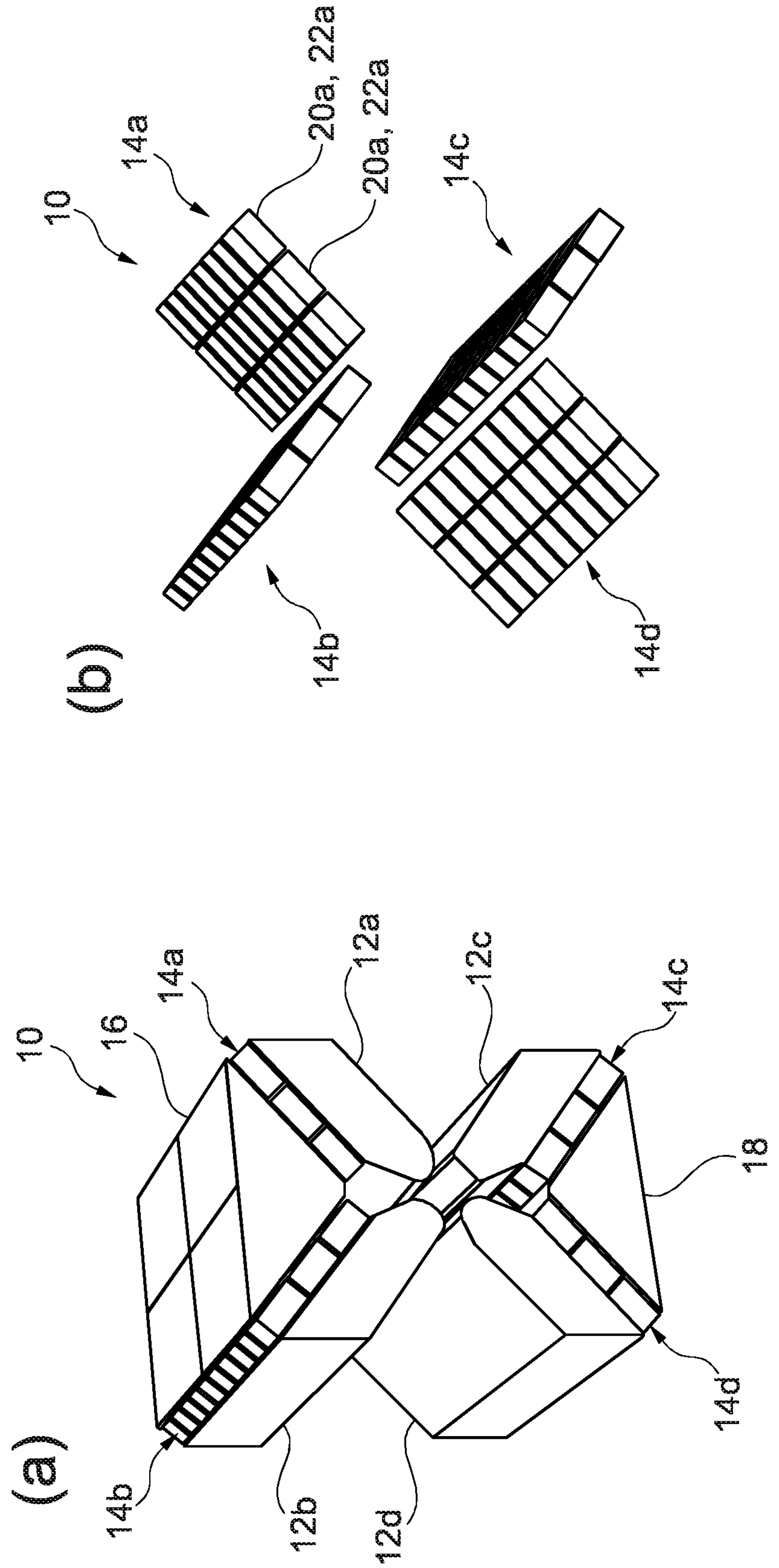
FIG. 1*a* is a schematic perspective view of a multipole magnet according to an embodiment of the invention.
FIG. 1*b* is a further schematic perspective view of the multipole magnet of FIG. 1, showing only permanent magnets of the multipole magnet.
Figure 2:
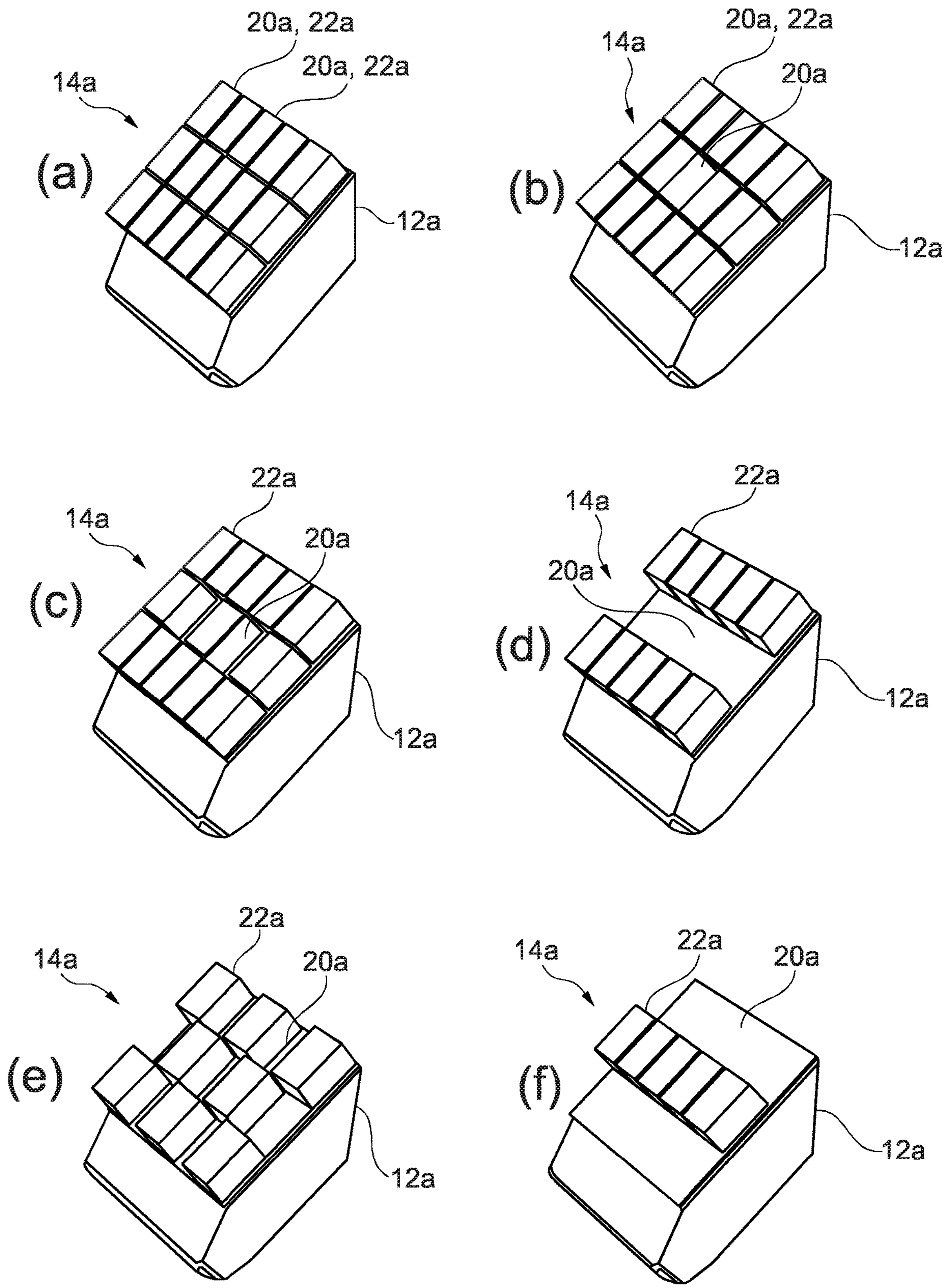
FIGS. 2*a-f* are schematic perspective views of configurations of permanent magnets according to multiple embodiments of the invention.

FIGS. 1*a-b* show a quadrupole magnet 10 according to an embodiment of the invention. The quadrupole magnet 10 has four ferromagnetic poles 12*a-d* arranged to provide a beamline space therebetween. In use, a beam of charged particles, such as electrons or positrons, passes through the beamline space. The quadrupole magnet 10 further comprises four permanent magnet assemblies 14*a-d*, each of the magnet assemblies 14*a-d* being associated with a respective one of the ferromagnetic poles 12*a-d*. Each of the permanent magnet assemblies 14*a-d* comprises a permanent magnet material to supply a magnetomotive force to the ferromagnetic poles 12*a-d*. The magnetomotive force produces a magnetic field that extends into the beamline space to deflect, focus or otherwise alter one or more characteristics of a beam of charged particles passing therethrough.

The quadrupole magnet 10 may comprise first and second magnet caps 16, 18, to which the magnet assemblies 14*a-d* may be attached. Specifically, two of the magnet assemblies 14*a-d* may be attached to the first magnet cap 16 and another two of the magnet assemblies 14*a-d* may be attached to the second magnet cap 18. In use, the magnet caps 16, 18 may be moveable relative to the ferromagnetic poles 12*a-d* to vary the distance between each of the magnet assemblies 14*a-d* and the associated respective ferromagnetic poles 12*a-d*, which consequently varies a magnetic flux across the beamline space. Therefore, a magnetic field strength within the beamline space may be variable by movement of the magnet caps 16, 18. As the skilled reader will appreciate, movement of the magnet caps 16, 18 may be symmetrical about the beamline space.

The magnet assemblies 14*a-d* may be structurally identical to one another (as best shown in FIG. 1*b*, in which the poles 12*a-d* and the magnet caps 16, 18 are hidden/not visible). Thus, as the skilled readerwill appreciate, features of the quadrupole magnet 10 described in relation to one of the magnet assemblies 14*a-d* may be equally applicable to any of the four magnet assemblies 14*a-d*. In the accompanying figures, like reference numerals are used for equivalent features, with letters a, b, c and d denoting the relevant one of the magnet assemblies 14*a-d*. In alternative embodiments, the magnet assemblies 14*a-d* may not all be structurally identical to one another. Indeed, in any general multipole magnet according to an embodiment of the invention, the magnet assemblies 14*a-d* may be different to one another.

The permanent magnet assembly 14*a* comprises a plurality of discrete permanent magnet positions 20*a* and a plurality of permanent magnets 22*a*, the permanent magnets 22*a* providing the quadrupole magnet 10 with the permanent magnetic material. Each of the plurality of permanent magnets 22*a* is fixed in one of the plurality of discrete permanent magnet positions 20*a*. The term "discrete" is to be understood to mean individually separate and distinct. Accordingly, the magnet assembly 12*a* has a finite number of discrete permanent magnet positions 20*a* in which each of the plurality of permanent magnets 22*a* must be fixed. As such, each of the permanent magnets 22*a* cannot be placed in one of a substantially infinite number of positions, nor a position other than one of the discrete permanent magnet positions 20*a*.

In certain embodiments, such as that shown in FIGS. 1*a-b*, the plurality of discrete permanent magnet positions 20*a* and a plurality of permanent magnets 22*a* may be equal in number to one another, with one of the permanent magnets 22*a* fixed in a respective one of each of the plurality of discrete permanent magnet positions 20*a*. The number of discrete magnet positions 20*a* is unchangeable for the magnet assembly 14*a* of a given embodiment. However, the number of permanent magnets 22*a* may be varied to adjust the strength of the quadrupole magnet 10. Accordingly, the plurality of discrete permanent magnet positions 20*a* may be greater in number than the plurality of permanent magnets 22*a* fixed therein. The strength of the quadrupole magnet 10 may be reduced by selectively omitting one or more of the permanents magnets 22*a* from one or more of the respective permanent magnet positions 20*a*. In this regard, as the skilled reader will appreciate, many different configurations are possible.

Figure 4:
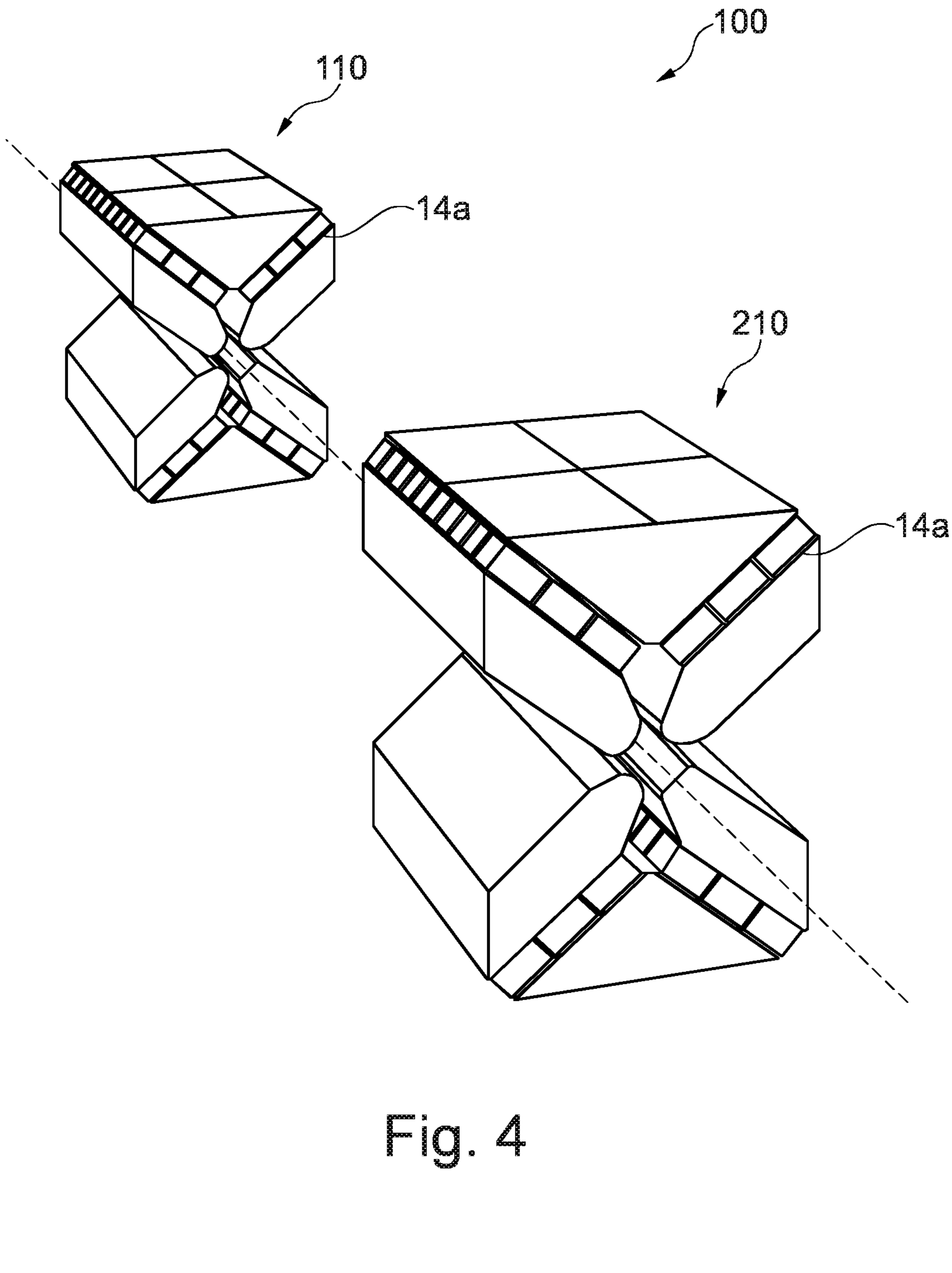
FIG. 4 is schematic perspective view of a plurality of multipole magnets disposed along a beamline according to an embodiment of the invention.

FIGS. 2*a-f* show various, non-limiting configurations of the magnet assembly 14*a* according to embodiments of the invention, with successively illustrated embodiments having a greater number of the permanent magnets 22*a* omitted. A different configuration, including a different total number of the permanent magnets 22*a* and/or one or more of the plurality of permanent magnets 22*a* being fixed in a different one or more of the plurality of permanent magnet positions 20*a*, may be readily created to provide a quadrupole magnet 10 that exhibits a desired magnetic field strength, or a desired range of magnetic field strengths, for a given point along a beamline of a particle accelerator. This may provide a modular approach to manufacturing multipole magnets having different magnetic field strengths. As such, in a sub-assembly 100 of multiple quadrupole magnets 100, 200, the permanent magnet assembly 14*a* of a first quadruple magnet 110 may have a configuration different to the permanent magnet assembly 14*a* of a second quadruple magnet 210, as shown in FIG. 4 (in which a beamline along which the multiple quadrupole magnets 100, 200 are disposed is indicated by a dotted line). Except for the configuration of the magnet assembly 14*a*, a plurality of multiple magnets disposed along a beamline may be otherwise structurally identical to one another. Each of the permanent magnets 22*a* may be the same size and shape as one another, as this may further facilitate the modular approach. As shown in the illustrated embodiments, the shape of the permanent magnets 22*a* may be cuboid.

As shown in each of the illustrated embodiments, the plurality of discrete permanent magnet positions 20*a* may be provided as a uniformly spaced or distributed array. Once again, this may further facilitate the modular approach. As such, the uniformly spaced array may be a grid of n by m discrete permanent magnet positions 20*a*. As shown in FIGS. 1*a-b*, the plurality of discrete permanent magnet positions 20*a* may be provided a uniformly spaced or distributed array of 10 by 3 permanent magnet positions 20*a*. However, there is no requirement that a grid of n by m discrete permanent magnet positions 20*a* must be uniform. In certain embodiments, there may be provided groups or sub-sets of the permanent magnet positions 20*a*, each of the groups comprising permanent magnet positions 20*a* of a different size and/shape than that of the others.

Each of the arranged magnets 22*a* may be arranged in any of the permanent magnet positions 20*a*. However, the permanent magnets 22*a* may be arranged in the permanent magnet positions 22*a* symmetrically about a centre of the permanent magnet assembly 14*a*. Indeed, for this reason, each of FIGS. 2*a-f* show only half of the magnet assembly 14*a*, hence the magnet assembly 14*a* appears as having 5 by 3 permanent magnet positions 20*a*, rather than 10 by 3 permanent magnet positions 20*a* shown in FIGS. 1*a-b*. Of course, in any general multipole magnet according to an embodiment of the invention, any number of permanent magnet positions 20*a* may be provided.

In certain embodiments, the plurality of discrete permanent magnet positions 20*a* may provide a separation between of each of the permanent magnets 22*a*. As such, each of the permanent magnets 22*a* may be spaced apart from one another. This may allow for each of the permanent magnets 22*a* to be fixed in the permanent magnet positions 20*a* without contacting one another, which may facilitate manufacture of the magnet assembly 14*a*. In certain embodiments, the separation may be between 0.5 mm and 2 mm.

Figure 3:
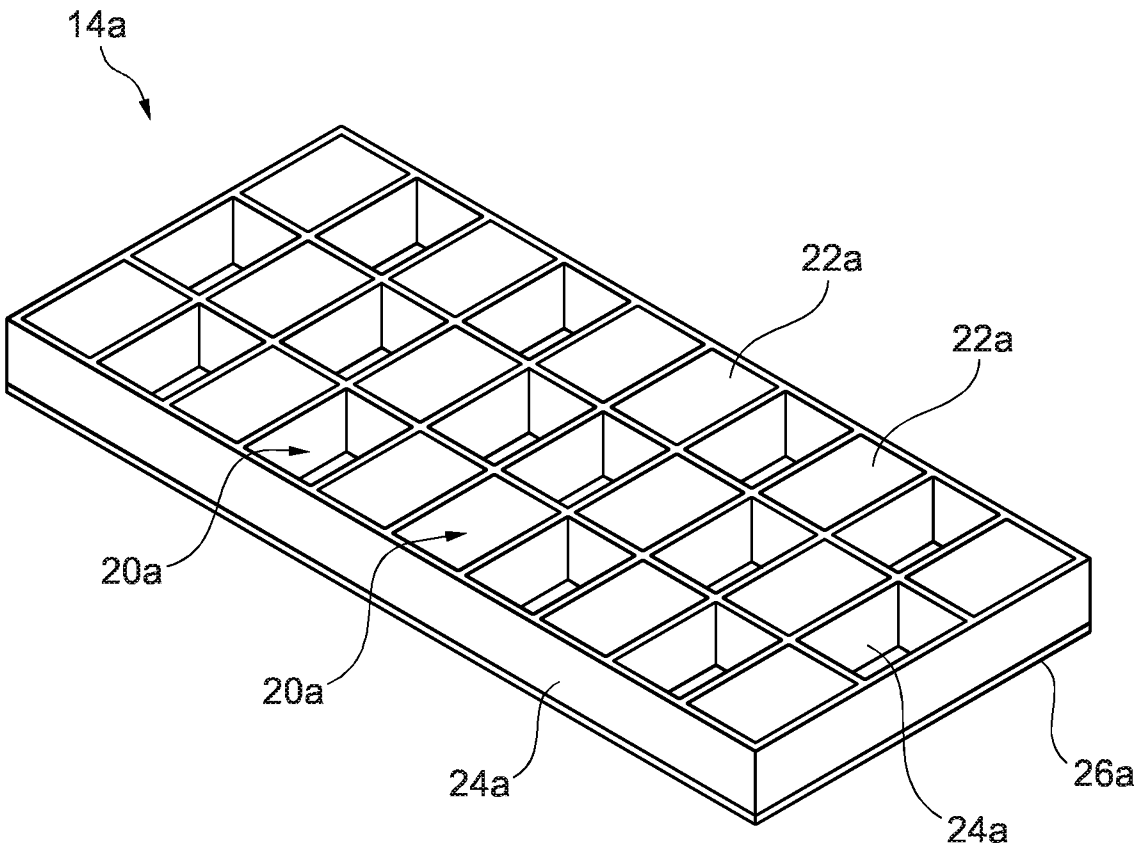
FIG. 3 is a schematic perspective view of a permanent magnet assembly according to an embodiment of the invention.

As shown in FIG. 3, the magnet assembly 14*a* may comprise a framework of walls 24*a* delimiting the plurality of discrete permanent magnet positions 20*a*. The walls 24*a* may provide the separation between of each of the permanent magnets 22*a*. One or more of the walls 24*a* may extend partially or completely through the magnet assembly 14*a* and/or may form a boundary extending around the magnet assembly 14*a*. One or more of the walls 24*a* may intersect with one another, e.g. at right angles. The magnet assembly 14*a* may further comprise a base 26*a*. In certain embodiments, the framework of walls 24*a* may extend from the base 26*a*. The base 26*a* may be plate. Although, in certain embodiments, the base 26*a* may be provided by one of the magnet caps 16, 18. Moreover, at least an underside of each of the permanent magnets 22*a* may be bonded to the base 26*a* to fix each of the permanent magnets 22*a* in a respective one of the permanent magnet positions 20*a*. However, other means of fixing are contemplated, e.g. mechanical fasteners, screws and the like. Bonding, by way of an adhesive substance, may be relatively quicker and easier than other means.

A gap (not shown) may extend between each of the permanent magnets 22*a* and the walls delimiting a respective one of the plurality of discrete permanent magnet positions 20*a*. The adhesive substance used to bond the permanent magnets 22*a* to the base may at least partially fill the gap. As such, the adhesive substance bonding the permanent magnets 22*a* to be base 26*a* may be bonded to one or more sides of each of the permanent magnets 22*a*, as well as to the underside. This may facilitate maintaining the permanent magnets 22*a* in the permanent magnet positions 20*a*, particularly by resisting twisting and/or overturning movements of one or more of the permanent magnets 22*a* relative to the base 26*a* (which may arise from attractive forces between adjacent permanent magnets 22*a*).

As shown in FIG. 3, the framework of walls 24*a* and the base 26*a* may provide a plurality of open-ended enclosures, which delimit each of the permanent magnet positions 20*a*. As such, each of the open-ended enclosures is a continuous five-sided compartment. In use, the each of the permanent magnets 22*a* is at least partially received within a respective one of the open-ended enclosures. In certain embodiments, the permanent magnet assembly 14*a* may comprise a plurality of open-ended enclosures delimiting the permanent magnet positions 20*a* that are formed by other means, e.g. a plurality of recesses may be provided in the magnet caps 16, 18.

Each of the open-ended enclosures may be substantially the same in shape and/or size as one another and/or or may be complementary in shape to each of the plurality of permanent magnets 22*a*. This may facilitate the modular approach and/or provide the gap with a constant width extending around a periphery of each of the permanent magnets 22*a*.

The invention is not restricted to the details of any foregoing embodiments. For example, while the invention is described above in relation to a quadrupole magnet, the invention relates to multipole magnets having any number of poles. Throughout the description and claims of this specification, "ferromagnetic" is to be understood as synonymous with "magnetically soft" and "magnetically permeable" and to refer to reasonably high permeability of at least 10μ0, where μ0 is the permeability of free space. For the invention, one suitable ferromagnetic material is steel. However, other suitable ferromagnetic materials may be used. Each of the magnets may be a neodymium (NdFeB) magnet. The frame work of walls 24*a* may be formed of a non-magnetic material, e.g. aluminium. The base may be formed of a paramagnetic material, e.g. carbon steel.

All features disclosed in this specification (including any accompanying claims and figures) may be combined in any combination, except combinations where at least some of such features are mutually exclusive. Each feature disclosed in this specification (including any accompanying claims and figures), may be replaced by alternative features serving the same, equivalent or similar purpose, unless expressly stated otherwise. Thus, unless expressly stated otherwise, each feature disclosed is one example only of a generic series of equivalent or similar features.

The invention extends to any novel one, or any novel combination, of the features disclosed in this specification (including any accompanying claims and drawings). The claims should not be construed to cover merely the foregoing embodiments, but also any embodiments which fall within the scope of the claims.

The invention claimed is:

1. A multipole magnet for deflecting a beam of charged particles, the multipole magnet comprising:
- a plurality of ferromagnetic poles; and
- a plurality of permanent magnet assemblies to supply a magnetomotive force to the ferromagnetic poles, at least one of the permanent magnet assemblies having a plurality of discrete permanent magnet positions and a plurality of permanent magnets each fixed in one of the plurality of discrete permanent magnet positions.

2. A multipole magnet according to claim 1, wherein the plurality of discrete permanent magnet positions is greater in number than the plurality of permanent magnets fixed therein.

3. A multipole magnet according to claim 1, wherein the plurality of permanent magnets is arranged in the plurality of discrete permanent magnet positions symmetrically about a centre of the at least one of the permanent magnet assemblies.

4. A multipole magnet according to claim 1, wherein the plurality of discrete permanent magnet positions is a uniformly spaced array of discrete permanent magnet positions.

5. A multipole magnet according to claim 4, wherein the uniformly spaced array is a grid of n by m discrete permanent magnet positions, both n and m being integers greater than 1.

6. A multi pole magnet according to claim 1, wherein each of the plurality of permanent magnets are spaced apart from one another.

7. A multipole magnet according to claim 1, wherein each of the plurality of permanent magnets are substantially the same in shape and/or size as one another.

8. A multipole magnet according to claim 1, wherein one or more of the plurality of permanent magnets is substantially cuboid.

9. A multipole magnet according to claim 1, wherein the at least one of the permanent magnet assemblies comprises a framework of walls delimiting one or more of the plurality of discrete permanent magnet positions.

10. A multipole magnet according to claim 9, wherein one or more of the walls are formed of a non-magnetic material.

11. A multipole magnet according to claim 9, wherein the at least one of the permanent magnet assemblies comprises a base from which the framework of walls is upstanding.

12. Multipole magnet according to claim 11, wherein the base is formed of a paramagnetic material.

13. A multipole magnet according to claim 11, wherein one or more of the plurality of permanent magnets is bonded to the base.

14. A multipole magnet according to claim 11, wherein a gap extends between one or more of the plurality of permanent magnets and one or more of the walls delimiting a respective one of the plurality of discrete permanent magnet positions and the gap is filled at least partially by an adhesive material bonded to the base and the respective one or more of the plurality of permanent magnets.

15. A multipole magnet according to claim 11, wherein the at least one of the permanent magnet assemblies comprises a plurality of open-ended enclosures each delimiting one of the plurality of discrete permanent magnet position and one or more of the plurality of open-ended enclosures are each provided by the framework of walls and the base.

16. A multipole magnet according to claim 9, wherein a gap extends between one or more of the plurality of permanent magnets and one or more of the walls delimiting a respective one of the plurality of discrete permanent magnet positions.

17. A multipole magnet according to claim 1, wherein the at least one of the permanent magnet assemblies comprises a plurality of open-ended enclosures each delimiting one of the plurality of discrete permanent magnet positions.

18. A multipole magnet according to claim 17, wherein each of the plurality of open-ended enclosures are substantially the same in shape and/or size as one another.

19. A multipole magnet according to claim 17, wherein one or more of the plurality of open-ended enclosures is a continuous five-sided compartment.

20. A multipole magnet according to claim 17, wherein one or more of the plurality of open-ended enclosures is complementary in shape to one of the plurality of permanent magnets.

21. A multipole magnet according to claim 1, wherein each of the magnet assemblies is associated with a respective one of the ferromagnetic poles.

22. A multipole magnet according to claim 1, wherein the multipole magnet comprises four permanent magnet assemblies, with two of the magnet assemblies being attached to a first magnet cap and another two of the magnet assemblies being attached to a second magnet cap.

23. A method of manufacturing a multipole magnet for deflecting a beam of charged particles, the method comprising:
- providing at least one permanent magnet assembly having a plurality of discrete permanent magnet positions;
- fixing a plurality of permanent magnets in the plurality of discrete permanent magnet positions; and
- arranging the at least one permanent magnet assembly to supply a magnetomotive force to a ferromagnetic pole of the multipole magnet.

24. A sub-assembly for a particle accelerator, the sub-assembly, comprising:

a plurality of multipole magnets according to claim 1 disposed along a beamline to deflect, focus or otherwise alter one or more characteristics of a beam of charged particles passing along the beamline;

wherein the at least one permanent magnet assembly of a first multipole magnet of the plurality of multipole magnets has a configuration different to that of a second multipole magnet of the plurality multipole magnets.

25. A sub-assembly according to claim 24, wherein the configuration is different in that the least one permanent magnet assembly of the first multipole magnet has a different number of the plurality of permanent magnets to that of the second multipole magnet.

26. A sub-assembly according to claim 24, wherein the configuration is different in that the least one permanent magnet assembly of the first multipole magnet has one or more of the plurality of permanent magnets fixed in a different one or more of the plurality of permanent magnet positions to that of the second multipole magnet.

* * * * *